United States Patent [19]
Bergman et al.

[11] Patent Number: 6,005,971
[45] Date of Patent: *Dec. 21, 1999

[54] METHOD, SYSTEM AND PROGRAM PRODUCTS FOR DISPLAYING MULTIPLE TYPES OF DATA IN SINGLE IMAGES

[75] Inventors: Lawrence David Bergman, Kisco, N.Y.; John Alan Gerth, Half Moon Bay, Calif.; John Timothy Robinson, Yorktown Heights; Bernice Ellen Rogowitz, Ossining, both of N.Y.

[73] Assignee: International Business Machines Corporation, Armonk, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/733,201

[22] Filed: Oct. 18, 1996

[51] Int. Cl.$^6$ ........................................ G06K 9/00
[52] U.S. Cl. .......................... 382/165; 345/153; 382/274; 382/284
[58] Field of Search ...................... 345/153, 199, 345/431, 115, 439; 358/518, 520, 540, 450, 523; 382/162, 165, 167, 274, 284; 348/557, 577, 599, 649, 650, 655, 663, 717, 584, 588, 598

[56] References Cited

U.S. PATENT DOCUMENTS

| | | | |
|---|---|---|---|
| 4,985,853 | 1/1991 | Taylor et al. | 345/431 |
| 5,181,105 | 1/1993 | Udagawa et al. | 358/520 |
| 5,452,017 | 9/1995 | Hickman | 358/520 |
| 5,479,186 | 12/1995 | McManus et al. | 345/11 |
| 5,491,522 | 2/1996 | Hong | 348/663 |
| 5,619,590 | 4/1997 | Moore, Jr. | 382/162 |
| 5,691,779 | 11/1997 | Yamashita et al. | 348/649 |
| 5,754,185 | 5/1998 | Hsiao et al. | 345/431 |

*Primary Examiner*—Amelia Au
*Assistant Examiner*—Timothy M. Johnson
*Attorney, Agent, or Firm*—Kevin M. Jordan, Esq.; Heslin & Rothenberg, P.C.

[57] ABSTRACT

Production and processing of data representing digitized images are disclosed. The disclosure addresses the problem of providing an image which simultaneously represents both high spatial resolution information and low spatial resolution information which pertains to the high spatial resolution information. Images may be produced which represent high spatial resolution information in the form of relative luminance contrasts, and represent low spatial resolution information in the form of color variance. Images representing high spatial resolution information may be altered to represent areas sharing a common trait (low spatial resolution information) by altering image data to make all pixels of those areas a common color, while scaling the luminance of each altered pixel by a uniform factor relative to its luminance in the original representation of the image.

34 Claims, 3 Drawing Sheets

METHOD, SYSTEM AND PROGRAM PRODUCTS FOR DISPLAYING MULTIPLE TYPES OF DATA IN SINGLE IMAGES

The invention described herein was made in the performance of work under NASA Contract No. NCC5-101 and is subject to the provisions of Section 305 of the National Aeronautics and Space Act of 1958 (42 U.S.C. 2457).

FIELD OF THE INVENTION

The invention pertains to the field of processing of data representing digitized images. The invention addresses the problem of providing an image which simultaneously represents both high spatial resolution information and low spatial resolution information which pertain to a common subject.

BACKGROUND OF THE INVENTION

Digitized images are images which are represented in a digital data format. Digitized images are commonly represented in "rasterized" or "bit mapped" formats in which the value of each pixel of the image is individually represented in the data. In the case of monochrome images, each pixel may be represented by data indicating its luminance on a grey scale ranging from black (no luminance) to white (maximum luminance). Thus, a typical monochrome image data file may include one byte for each pixel, providing a range of 256 different luminance values for each pixel. In the case of "color" images, each pixel may be represented by data indicating the values of its respective red, green and blue (RGB) components. For example, an image may be represented in a "24 bit" data format which includes one byte for each of the RGB components of each pixel, thus providing a range of over 16 million different pixel values. Grey scale pixels in RGB images are typically characterized by equal red, green and blue values.

The pixels of a color image may alternatively be characterized by data representing their hue, saturation, and value (HSV) components. In the HSV system and similar systems of representation, the hue component indicates the color of the pixel, the saturation component indicates the relative amounts of color and grey-scale value of the pixel, and the value component indicates the pixel's luminance or value intensity. A variety of formulas are known for converting an RGB pixel representation to its equivalent HSV representation.

Where it is desirable to reduce the amount of data necessary to represent a color image, the pixels of an image may be represented by data associated with a color map. For example, consider an image represented in 24 bit color. While each pixel of the image may have any one of over 16 million different values, this range of color requires three bytes of storage for each pixel. However, using known processes, a histogram of the pixels of the image may be constructed to determine a smaller number of colors which are most representative of the colors of the image, and a color map including only those colors may be constructed. Subsequently, a modified image may be constructed which contains only the colors of the color map. The modified image may be represented as pixel data in the form of references to entries of the color map stored in the form of a color table. Thus if the color map contains 256 colors, each pixel of the image may be represented as a single byte reference to an entry in the color table, rather than as a three byte RGB representation.

The colors which may be displayed on known display devices such as printers and video displays vary in their dynamic ranges, i.e. in the maximum potential luminance of each color. The dynamic range of a color will depend in part on the display device. One approximation which is commonly used to determine the luminance of a pixel in an RGB image is represented by the formula $L=0.3(R)+0.6(G)+0.1(B)$. It may be seen that in this approximation the green component G of an image contributes more luminance than the red component R, and much more luminance than the blue component B. It may be inferred from this approximation that colors in the green range of the display spectrum will have approximately twice the dynamic range of colors in the red range of the spectrum, and approximately six times the dynamic range of colors in the blue range of the spectrum.

In regard to the processing of digitized images, it is recognized that it is sometimes desirable to provide an image which represents both a set of high spatial resolution information, for example the topographical features of a land mass, and a set of low spatial resolution information which pertains to the first set of information, for example, regions of the land mass having a certain temperature. Present methods for providing such images involve providing an image formulated from a first set of information, and then replacing areas of the image with representations formulated entirely from the second set of information. Thus, using the example begun above, an image of topographical features may be produced from topographical data. Subsequently, topographical representations areas of the land mass having temperatures within a certain range may be replaced in the image by a representation indicating the temperature region of interest, for example, a uniform color. Present technology enables users of computer systems to define areas of images to be altered through the use of a pointing device such as a mouse, wherein the motions of the mouse indicate the border of an area to be altered.

BRIEF SUMMARY OF THE INVENTION

The applicants have recognized that the present practice in digital image processing for providing an image representing both a set of high spatial resolution information and a set of low spatial resolution information pertaining to a common subject fails to optimize the potential of the image to convey information in accordance with the physiological attributes of the viewer. It is known in the field of neurophysiology that the magno-cellular pathway, which is receptive to visual information presented as color variations, diminishes in its receptiveness as the visual information increases in spatial resolution (i.e. detail). Thus as visual information becomes highly detailed, representation of variations in the information through variations of image color becomes increasingly ineffective. However, the parvo-cellular pathway is receptive to variations in luminance even where spatial resolution is high. The applicants have thus determined that highly detailed information is preferably presented through luminance variations. Accordingly, the invention in general terms involves simultaneous visual representation of related sets of information such that low spatial resolution information is presented through variation of color, while high spatial resolution information is presented through variation of luminance.

To illustrate a manner in which the invention may be employed, consider that it is desired to produce an image from a first set of information representing the highly detailed topographical features of a land mass, and a second set of information representing less detailed surface temperature gradient across the land mass. In accordance with present technology, two images will be produced. The first image will present the topographical information. The second image will include the topographical image with sections replaced with color to represent temperature. These images are placed side to side to allow comparison by the viewer.

In contrast, the invention improves over known technology methods by producing images which provide simultaneous representation of high spatial resolution information and low spatial resolution information in a single image. For purposes of the invention, the individual pixels of a computer generated image are treated as having a value which consists of two components: color and luminance. The color value represents the hue and saturation of the pixel, while the luminance value represents the perceived brightness of the pixel. In general terms, the purpose of the invention is accomplished by representing low spatial resolution information through color variance and high spatial resolution information through luminance variance. Where the invention is implemented for altering high spatial resolution image data in accordance with corresponding low spatial resolution information, the process may be referred to as a "colorwash".

The invention may be employed in a variety of applications and embodiments. Consider an image representing high spatial resolution information in 24 bit color. In accordance with the invention, the pixels in areas of interest derived from a related set of low spatial resolution information will be redefined to represent the low spatial resolution information through color variance but to retain the relative luminance contrasts which are representative of the high spatial resolution information. Relative luminance contrasts may be preserved in a number of different ways. For example, if permitted by the dynamic range of the chosen color, the luminance values of the pixels may be preserved identically. Alternatively, the luminance values of pixels in the area may be scaled to preserve the relative luminance contrasts of the original representation of the image, but to span the full dynamic range of the chosen color. However, if the dynamic range of the chosen color is less than that of the pixels within the area of interest, or of the over-all image, the luminances of the pixels of either the area of interest or of the entire image may first be scaled to match the dynamic range of the chosen color. Alternatively, the pixels of the area of interest may be redefined to have the chosen color and to have luminances which are proportional to those from the original representation image. These methods may be similarly employed with multiple areas and multiple colors. However, in any case, it is preferable to utilize the same dynamic range across the entire image. Thus it may often be found necessary to scale the luminance values of each pixel of an entire image so that the dynamic range of the image matches that of the chosen color having the least dynamic range.

The invention may accordingly be embodied in a method for processing data representing an image. In a first embodiment this method includes, in general terms, determining pixels of the image to be altered and a color to which they are to be altered, and altering the image data to change those pixels to the chosen color and to have luminances proportional to those in the original representation of the image. The method may further comprise determining the maximum luminance of the color. If the dynamic range of the chosen color is sufficient, the pixels may be given the same luminances as in the original representation of the image. Alternatively, the changed pixel's luminance may be scaled so that the highest luminance within the chosen color's dynamic range is proportional to either the highest luminance among the changed pixels, or the highest luminance of the entire image. Where the dynamic range of the chosen color is less than that of either the area to be changed or the image as a whole, the image may initially be altered by scaling the pixels to be changed, or the whole image, respectively, to match the dynamic range of the chosen color. Analogous embodiments of the invention may include means for performing this method and computer program product means for programming a computer to perform this method.

The invention may further be embodied in a second alternative method for processing image data which is optimized to perform multiple color changes simultaneously and which may be further optimized to produce a final image in which the dynamic range of unaltered portions of the image does not exceed that of any altered portion of the image. This method includes, in general terms, determining pixels of the image to be altered and the colors to which they will be altered, determining maximum luminance of each of those colors, and determining the minimum of these maximum luminances. Subsequently, the maximum pixel luminance of the original representation of the image is determined, and if this is greater than the minimum of maximum color luminances, the image is proportionally scaled to have a new dynamic range equal to that of the color of change having the least dynamic range. The appropriate pixels of the image are then changed to their new colors and assigned proportional luminances. The luminance of each pixel may be made equal to the luminance prior to the color change, or may be scaled to utilize the full dynamic range of the color to which it is changed. Analogous embodiments of the invention may include means for performing this method and computer program product means for programming a computer to perform this method.

BRIEF DESCRIPTION OF THE DRAWINGS

The general description provided above, as well as other novel features, devices, and methods of operation pertaining to the invention, will be more readily understood from the following detailed description and the accompanying drawings in which.

DETAILED DESCRIPTION OF THE INVENTION

Figure 1:
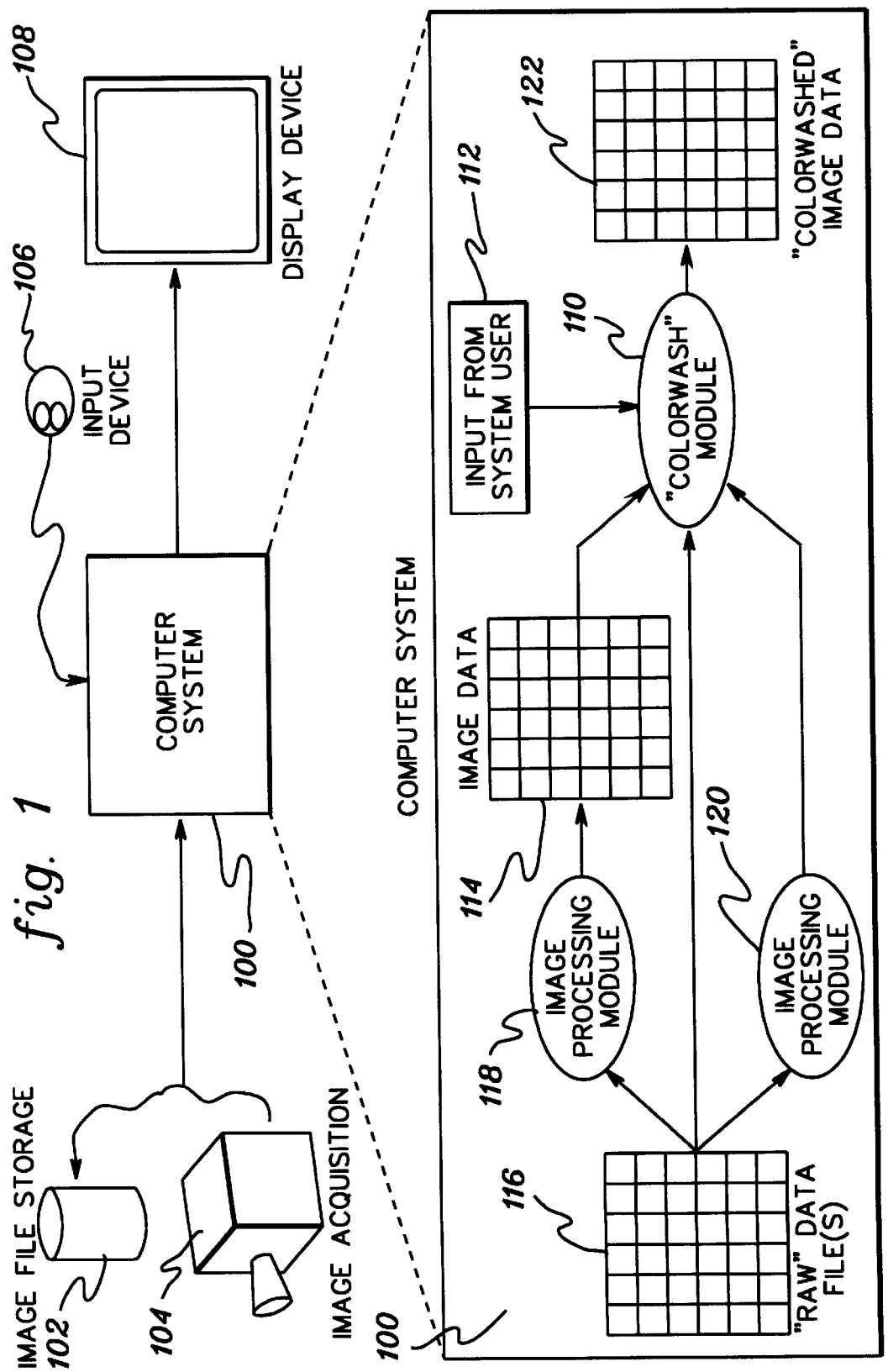
FIG. 1 illustrates in generic form an exemplary system embodiment for processing image data in accordance with the invention.

The invention in general terms involves systems, methods, and products for producing and processing image data. FIG. 1 illustrates in generic form an exemplary system for producing and processing image data in which the invention may be embodied. The production and processing of image data is generally performed by computer system 100. The system may receive image data from either data storage device 102 or image acquisition device 104, which may comprise a camera. The system receives input through input device 106 which may comprise a mouse, and displays image on display device 108 which may comprise a video display terminal.

The computer system 100 comprises a variety of data, modules, processes, and inputs. The processing of image data performed by the computer system 100 will be performed by colorwash module 110. The colorwash module will operate on input 112 from system users and on either "raw" data 116 or on image data. Image data may be provided as a processed image data file 114 generated by an image processing module 118, or it may be provided as the direct output of an image processing module 120. The colorwash module will produce colorwashed image data 122.

Accordingly, the invention may be embodied in a system as illustrated in FIG. 1. Further disclosure of the invention will be presented in three sections. The first section discloses methods for processing image data for the purpose of using color to identify, label or characterize regions of an image in manners which are optimized for perceptual processing by the human visual system. The second section discloses methods of color selection for presentation of low spatial resolution information. The third section discloses methods for generating an image representing a single set of high spatial resolution information and multiple sets of low spatial resolution information.

I. Processing Image Data in Accordance with the Invention

This section addresses the processing of image data for the purpose of using color to identify, label or characterize regions of an image in a manner which is optimized for perceptual processing by the human visual system.

Figure 2:
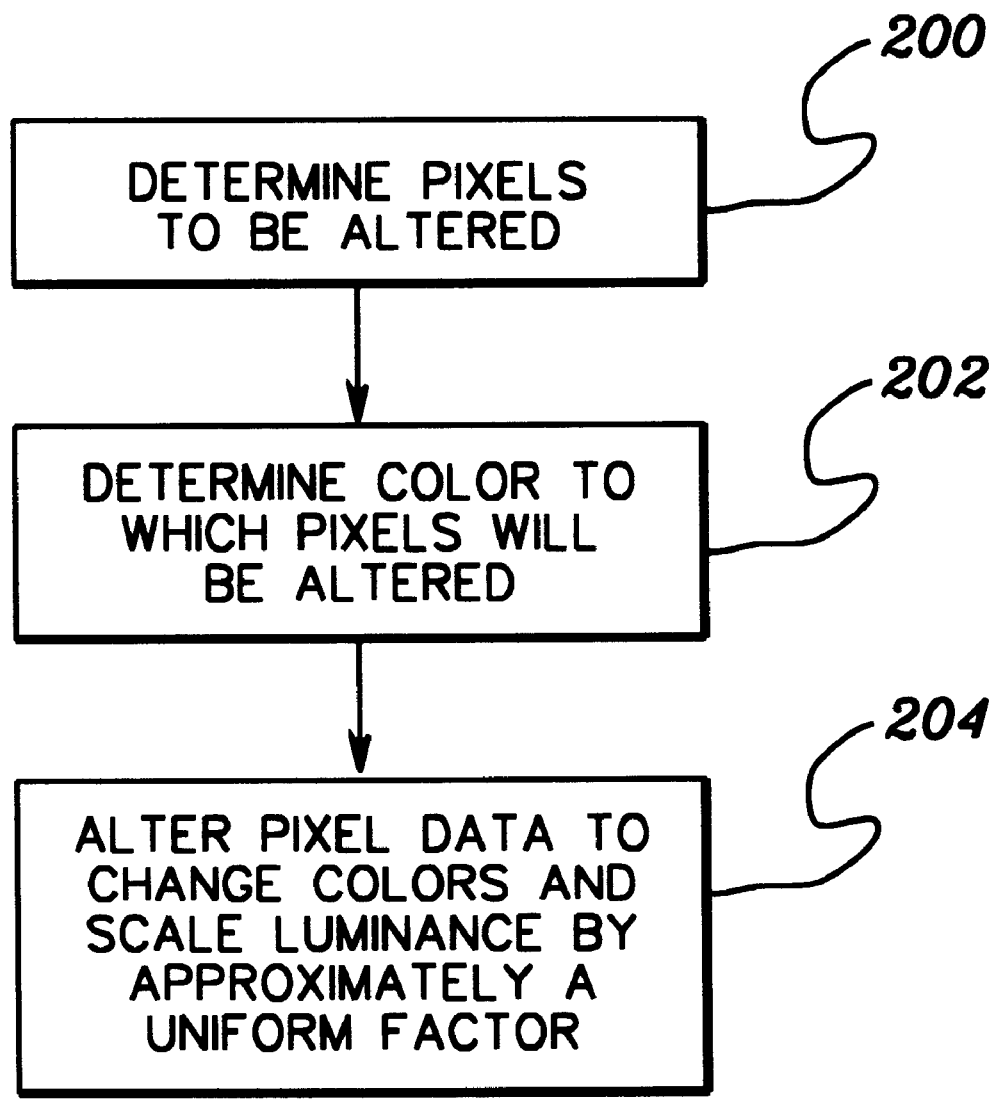
FIG. 2 provides a first example of process flow in an image processing system for processing image data in accordance with the invention.

Reference is made to FIG. 2, which provides a first example of process flow in an image processing system such as that of FIG. 1 for processing image data in accordance with the invention. It may be assumed for purposes of discussion of FIG. 2 that the data processing operation at issue involves processing of an image representing high spatial resolution information stored in a 24 bit format in a single data file. However, the method is equally applicable to any other form of storage of rasterized data, for example, data stored in three separate files containing respectively the red, green, and blue components of each pixel, or data stored in HSV format.

The method illustrated in FIG. 2 represents a first type of operation which may be performed on image data in accordance with the invention. Specifically, the operation involves assigning color to a region of an image such that the luminance value of each pixel in the area after coloring is the same as the luminance value before coloring. It is noted that this operation may be implemented by assigning color to a region of a monochrome image, or by making monochrome an area of a color image.

Referring specifically to FIG. 2, pixels of the image to be altered are first determined 200. The determination of these pixels may occur in a variety of ways. For example, a user of the system may indicate areas to be altered using an input device such as a mouse. Known processes may then be invoked to determine the pixels falling within the indicated area. Alternatively, a second data file containing low spatial resolution information pertaining to the image may be referenced. For example, a second file storing temperature data for areas represented in the image may be referenced to determine areas of the image to be altered for purposes of indicating temperatures within a particular range.

In addition to determining pixels to be altered, the system must also determine 202 a new color to which those pixels are to be altered to. This may be determined from user input indicating the proper color. Alternatively, proper colors may be supplied through reference to a look-up table, for example, a table indicating the proper display colors for parts of the image indicated to be within a particular temperature range.

Once the pixels to be altered and their new color have been determined, the system then alters 204 pixel data to change the color of the appropriate pixels to the new color and to scale their luminances by a uniform factor. The manner in which this occurs may vary depending upon the attributes of the image and the chosen color. For a first example, consider an image in which the dynamic range of the pixels of the image is 0–0.9 and the dynamic range of the pixels to be altered is 0–0.75. If the dynamic range of the new color is also 0–0.75, i.e. the maximum luminance value of that color (hereinafter max($L_{color}$)) is 0.75, then the pixels may be altered to retain the luminance of the original representation of the image. Thus, using the RGB formula for the new color, the system may simply calculate the proper red, green and blue values of new color which are necessary to produce the proper pixel luminance of each pixel. This luminance may be referred to hereinafter as $L_{pixel}$. Accordingly, the pixels may be said to be scaled by a uniform factor of approximately one. It will be recognized by those of ordinary skill in the art that this scaling factor is only approximately uniform because the system must choose from the discrete colors which are available. Thus the scaling factor will be approximate within a known and quantifiable range. The scaling may be done by a real-time processing of pixel data using a scaling formula, or it may be done through reference to a look up table associating luminance values with RGB color formulas.

An alternative manner of processing may be employed where the color which is chosen to alter an area is not capable of reproducing the full dynamic range of the area in which it is to be employed. In such cases it may be desirable to scale down the dynamic range of the image as a whole prior to altering areas so that the dynamic range of pixels within the area to be altered matches that of the color to which it will be altered. For example, consider the example begun above, with the variation that the dynamic range of the new color is 0–0.7. This range is less than that of both the image as a whole (0.9) and the pixels of the image to be altered (0.75). Accordingly every pixel of the image may be scaled by a factor of approximately max($L_{color}$)/max($L_{pixel}$) to reduce the dynamic range of the full image to that of the new color to which the area will be altered. Subsequently, when pixel colors are altered, their luminance values may remain the same as those in the scaled image prior to color alteration.

As an alternative to the processing methods described above, it may be desirable to alter an area of an image such that the relative pixel luminances of the area are maintained within the area, but are no longer in proportion to the rest of the image. For example, an area of an image may be altered to have a color with a dynamic range which is less than that of the pixels of the area in the original image. In this case the pixels may be altered so as to retain their relative luminances, but the area would have a dynamic range which is less than that of the area in the original image. The area is thus reduced in its capability to represent high spatial frequency information. Similarly, the area could be altered to have a color which has a greater dynamic range than that of the area in the original image. In this case the pixels may be altered so as to retain their relative luminances, but the area would have a dynamic range which is greater than that of the area in the original image. Thus the capability of the area to represent high spatial frequency information is enhanced.

To continue with the example begun above, consider now that the max($L_{color}$) of the color to which the area will be altered is 0.95. The color thus has a dynamic range which is greater than both that of the area to be altered (0.75) and of the overall image (0.9). The system may scale the luminances of each of the pixels in the area so that the area is presented with a greater dynamic range than in the original representation of the image. In such a case, the luminance of each pixel may be scaled by a uniform factor of $\max(L_{color})/\max(L_{pixel})$, where $\max(L_{pixel})$ is either the highest luminance value of any pixel among the pixels to be altered, or the highest luminance value of any pixel in the image. In the former case, the result will be that the pixel among those to be altered which has the highest luminance (0.75) will be altered to have the highest luminance of the new color (0.95), and all other altered pixels will be proportionally brightened. In the latter case, the result will be that the pixel among those to be altered which has the highest luminance will be altered to have the relative luminance which it would have if the dynamic range of the image as a whole had been that of the new color. The same scaling factor may be applied where the chosen color has a dynamic range which is less than that of the area in its original representation.

Accordingly, it may be seen from the examples above that color selection for an area to be altered may be made in accordance with the desired dynamic range of the area once it has been altered. If it is desired to reduce the capability of the altered area to represent high spatial frequency information, a color may be selected which has a dynamic range which is less than that of the area of alteration in its unaltered form. If it is desired to not affect the capability of the altered area to represent high spatial frequency information, a color may be selected which has a dynamic range which is equal to or greater than that of the area of alteration in its original form. Where the dynamic range of the chosen color is greater than that of the area to be altered, only that part of the dynamic range of the chosen color which matches that of the area in its unaltered from is utilized. If it is desired to enhance the capability of the altered area to represent high spatial frequency information, a color may be selected which has a dynamic range which is greater than that of the area of alteration in its original form. In such cases the relative luminances of each pixel will be scaled up by a uniform factor so that the pixels utilize the full dynamic range of the new color.

Figure 3:
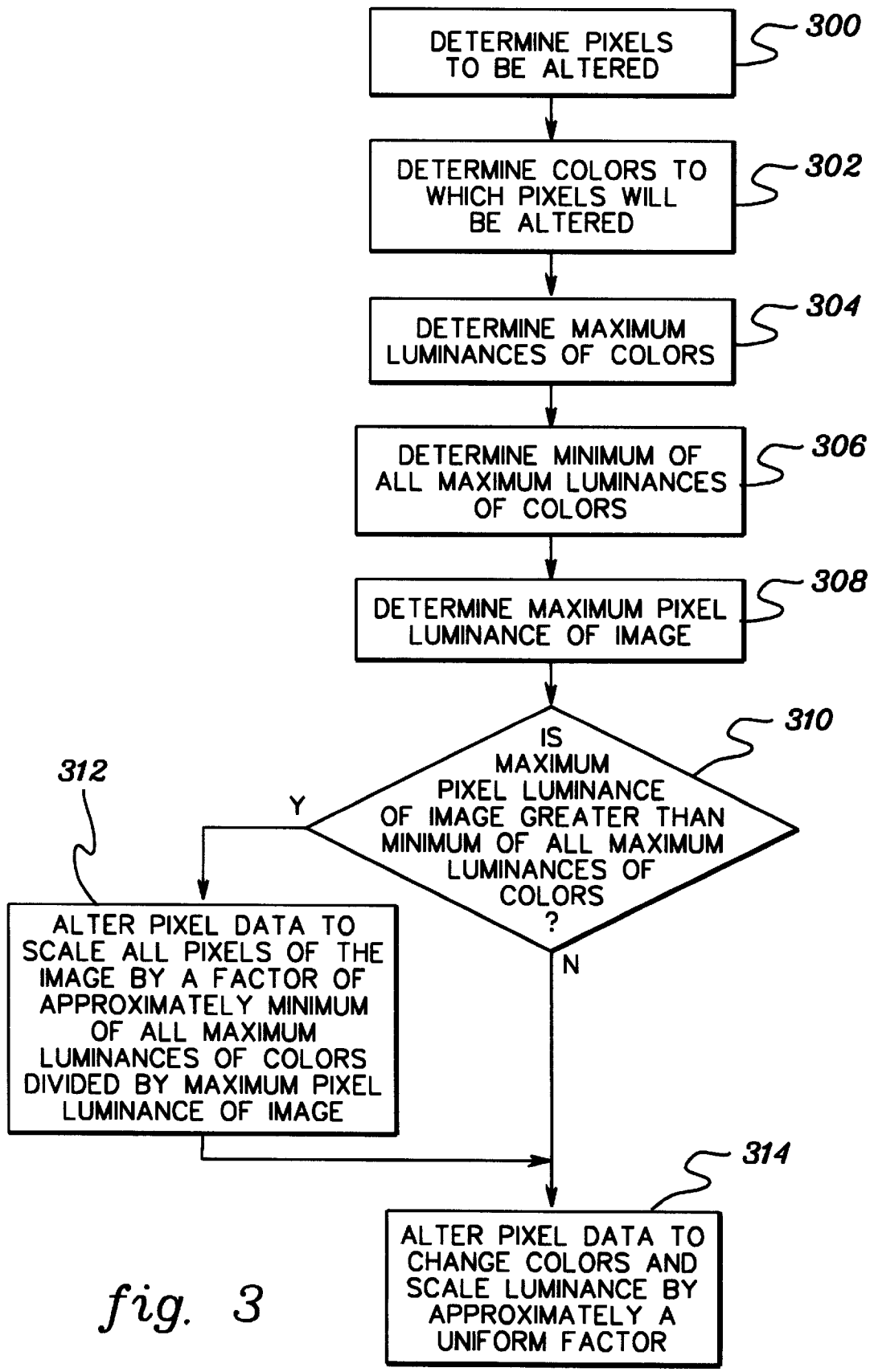
FIG. 3 provides a second example of process flow in an image processing system for processing image data in accordance with a preferred embodiment of the invention.

In some applications it will be desirable to alter multiple areas of the image and to use multiple new colors to independently represent each altered area. For example, it may be desirable to color the entirety of a satellite image using a different color to coincide with 10 degree temperature increments. For purposes of discussion, consider that pixels of the over-all image have a dynamic range of 0–0.9, pixels of a first area of the image have a dynamic range of 0–0.8 and will be altered to be of a color having a dynamic range of 0–0.6, and pixels of a second area of the image have a dynamic range of 0–0.75 and will be altered to be of a color having a dynamic range of 0–0.7. FIG. 3 provides an example of process flow in an image processing system for processing image data in accordance with such an application.

Referring specifically to FIG. 3, such a system will determine 300 the pixels to be altered and determine 302 the colors to which they will be altered. The system will also determine 304 the maximum luminances of the colors to which the pixels will be altered (referred to hereinafter as $\max(L_{colorN})$), and will determine the minimum of those maximums (referred to hereinafter as $\min(\max(L_{colorN}))$). Thus, using the numbers of the example, the system will determine that the minimum of maximum luminances of the colors to which pixels will be altered is 0.6, the maximum of the color to which pixels of the first area will be altered.

The system will then determine 310 whether the maximum pixel luminance of the image $\max(L_{pixel})$ is greater than $\min(\max(L_{colorN}))$. When this condition is satisfied, it indicates that at least one area of pixels to be altered will suffer a reduction in dynamic range relative to the rest of the image when the alteration is performed. Accordingly, the system will alter 312 all pixel data to scale all pixels of the image by a factor of approximately $\min(\max(L_{colorN}))/\max(L_{pixel})$. The scaled image will thus have a dynamic range which is equal to that of the least dynamic of colors to which pixels will be altered.

The system then alters 314 pixel data to change the color of the appropriate pixels to their respective new colors and to scale their luminances by a uniform factor which is specific to the new color of the pixel. Where it is desired to maintain a uniform dynamic range across the entire image, the alteration may be performed to approximately maintain the luminance value of each pixel, the luminance of each pixel thus being scaled by a factor of approximately one. However, where it is desired to maximize the luminance contrast provided by each new color, the luminance values of each pixel may be scaled by a factor of $\max(L_{colorN})/\max(L_{pixel})$. Thus the new color having the least dynamic range will provide a dynamic range equal to that of the image (which has been previously scaled to match that color's dynamic range), and other new colors will provide the dynamic range which each area would have had if the dynamic range of the scaled image as a whole had been that of the area's respective new color.

For purposes of further discussion of the process of FIG. 3, consider now that the dynamic ranges of the two new colors are both 0–0.99, thus being greater than the dynamic range of the image in its original representation. The system will thus determine 310 that the maximum pixel luminance of the image $\max(L_{pixel})$ is not greater than $\min(\max(L_{colorN}))$, and will accordingly alter the appropriate pixels without first scaling the entire image. Similarly to the case described above, where it is desired to maintain a uniform dynamic range across the entire image, the alteration may be performed to approximately maintain the luminance value of each pixel, the luminance of each pixel thus being scaled by a factor of approximately one. However, where it is desired to maximize the luminance contrast provided by each new color, the luminance values of each pixel may be scaled by a factor of $\max(L_{colorN})/\max(L_{pixel})$. Thus the new colors will provide the dynamic range which each area would have had if the dynamic range of the image as a whole had been that of the area's respective new color.

The various alternative processes described in regard to the flow diagrams of FIGS. 2 and 3 may be implemented, for example, on a computer system as illustrated in FIG. 1. Such implementation may be carried out through the use of computer program product means for programming the computer system to perform such processes. Such computer program product means may be provided as a program stored in system memory or may be provided on a storage medium which is independent of any system embodiment. A computer system programmed in accordance with the various alternative processes described in regard to the flow diagrams of FIGS. 2 and 3 is considered for purposes of the invention to comprise the various means necessary to perform the steps of those processes.

While the process of FIG. 2 and its related system and computer program product embodiments provide a number of alternative embodiments of the invention, and while the process of FIG. 3 and its related system and computer program product embodiments provide certain optimizations which are preferred in embodiments of the invention, additional embodiments may be implemented by those of ordinary skill in the art. For example, it will be apparent that the process of FIG. 3 may be varied to provide relative dynamic ranges in altered areas which are scaled with respect to the most luminant of pixels of that area, rather than the most luminant of pixels of the entire image. Similarly, it will be recognized that these processes may be applied to monochrome images and images stored in color formats. Thus in accordance with the invention, areas of a monochrome image may be colored, and areas of a colored image may be altered to monochrome.

II. Color Selection for Presentation of Low Spatial Resolution Information

As noted above, different colors have different dynamic ranges, and in some instances it may be desirable to exploit the full dynamic range of colors rather than to provide an image which is scaled to a single dynamic range. Accordingly, color selection may be influenced by additional factors which suggest desirable dynamic ranges of colors chosen to represent low spatial resolution information.

A first method of assigning colors may be based on the assignment of an importance factor to each data point of the low spatial resolution information. The importance factor may in turn be used to rate the relative importance of each data point and to assign a color to each data point which is proportional to its importance factor. In some instances the importance factor may be assigned by the user. For example, consider that it is desired to produce an image which presents both highly detailed topographical information and less detailed information indicating areas within that topography which are believed to contain mineral reserves. The anticipated mineral yield of each reserve may be entered by the user as an importance factor, and in turn, the importance factor would be used by the image processing system to assign to the area having the greatest assigned importance the color having the greatest dynamic range. Lesser yielding areas would consequently be assigned colors with dynamic ranges which are proportionally smaller.

Alternatively, importance factors may be assigned by the system itself. For example, consider that it is desired to produce an image which presents both highly detailed topographical information and less detailed information indicating the areas of counties within that topography. The system may assign an importance factor to each county which is representative of the relative spatial resolution of topological data within the area of the county. The system will assign colors having the greatest dynamic ranges to areas having the most detailed topographical features, thereby producing an image in which color selection optimizes the presentation of both the fine details of the topographical information and the coarse details of county areas.

It may further be desirable to utilize importance factors which vary over time in accordance with a dynamic set of information. For example, consider that it is desired to produce an image which presents a highly detailed information in the form of a map of an urban area and less detailed information in the form of areas of the urban area in which emergency situations are occurring. The system may accordingly assign importance factors to emergency areas which are determined based on the nature of the emergency and the present state of response to the emergency. Moreover, the system may continually reassign importance factors to each area based on updated information as to the nature of the emergency and the state of present response. Accordingly, the system will produce a dynamic image in which areas of greatest importance are represented in a color having the greatest dynamic range, and in which areas will be reassigned to have colors with greater or lesser dynamic ranges as the importance factor varies over time.

A second method of assigning colors may involve correlating the dynamic range of assigned colors with a specific characteristic of the low spatial resolution information which it represents. For example, consider that it is desired to produce an image presenting detailed topographic information and less detailed temperature information. The system may assign colors representing predetermined temperature ranges such that temperatures are represented by colors having proportional dynamic ranges. Thus the system will produce an image in which the coldest temperatures are represented by colors having the least dynamic range, while the hottest temperatures are represented by colors having the greatest dynamic range. Moreover, the low spatial resolution temperature information may be time variant, such that the system will continually update the image and reassign colors to areas as they traverse temperature ranges.

III. Methods for Generating an Image Representing a Single Set of High Spatial Resolution Information and Multiple Sets of Low Spatial Resolution Information The exemplary embodiments disclosed in the preceding two sections were discussed in conjunction with examples which involved a single set of high spatial resolution information and a single set of low spatial resolution information, e.g. topography and temperature. However, the invention may further be employed in implementations involving a single set of high spatial resolution information and multiple sets of related low spatial resolution information. For example, consider that it is desired to produce an image which presents highly detailed topographical information, less detailed information pertaining to the areas of each county with in the topography, and less detailed population density information within the topography. Accordingly, the system may assign each county a color, and within that county, vary the color in accordance with population density. Depending on the information being represented, such variation could be presented in the form of gradual transitions between colors, for example, by gradual hue or saturation variations, or in the form of distinct transitions between colors. Moreover, in accordance with methods disclosed in Section II, an importance factor may be assigned to each county for the purpose of selecting colors. In the present example, the importance factor could be a function of the degrees of detail of the topographical information and population density information of the county.

Thus the invention may generally be embodied in methods, system and products for representing information in the form of an image by coloring areas of the image in accordance with low spatial resolution information while retaining high spatial information presented in the form of luminance variations. The invention may further involve color choices based on importance factors or other criteria reflecting additional characteristics of the low spatial resolution data being represented. The invention may be implemented to produce images from a set of high spatial resolution information and one or more sets of related low spatial resolution information.

While the specific embodiments described above provide structures and methods which are best modes presently known to the inventors for carrying out the invention, the invention is capable of a variety of alternative embodiments. The flow diagrams, hardware configurations, processes, color representation standards and scaling techniques depicted herein are exemplary. Those of ordinary skill in the art will be aware of other modifications involving equivalent components, methods of operation and methods of use which may be made to the embodiments described herein without departing from the scope of the invention as defined in the following claims.

What is claimed is:

1. A method for producing an image represented by values of pixels, each value of each pixel of said image comprising a hue and a saturation pair color value and a luminance value $L_{pixel}$, said method comprising:

(i) determining, for each pixel of said image as a whole, said luminance value $L_{pixel}$ from a first data set representative of a first type of information to be depicted as said image;

(ii) identifying a subset of pixels to be altered, out of said image as a whole, based upon information from a second data set representative of a second type of information to be depicted in said image, wherein each pixel of said subset possesses a common trait not possessed by said pixels of said image that are not members of said subset, wherein said second data set containing said information used to identify said subset originates from a source distinct from said first data set;

(iii) assigning a single color to each said pixel of said subset to indicate possession of said common trait, and altering said hue and saturation pair color values of said subset such that each pixel of said subset has the same hue and saturation pair color values in accordance with said assignment; and (iv) scaling the luminance value $L_{pixel}$ of each pixel in said subset by a uniform factor thereby maintaining relative contrast among said luminance values $L_{pixel}$, as derived from said first data set, wherein said first type of information to be depicted as said image is visually represented by said luminance values $L_{pixel}$, within said image, and wherein said common trait possessed by said subset of pixels identified from information derived from said second data set is visually represented within said image as having the same hue and saturation pair color values.

2. The method of claim 1, wherein said method further comprises:

determining a maximum luminance value $max(L_{color})$ for said color value; and determining a maximum value of luminances $max(L_{pixel})$ of said subset having said common trait;

said uniform factor being $max(L_{color})/max(L_{pixel})$.

3. The method of claim 1, wherein said method further comprises:

determining a maximum luminance value $max(L_{color})$ for said color value; and determining a maximum value of luminances $max(L_{pixel})$ of pixels of said image;

said uniform factor being $max(L_{color})/max(L_{pixel})$.

4. The method of claim 3, wherein said assigning (iii) is preceded, if $max(L_{pixel})$ is greater than $max(L_{color})$, by scaling the luminance value $L_{pixel}$ of each of said pixels of said image by a factor of $max(L_{color})/max(L_{pixel})$.

5. The method of claim 1, wherein said uniform factor is one.

6. The method of claim 1, wherein said second data set used in said dentifying at least one subset of pixels to be altered comprises at least one of:

one or more data files separate from said first data set containing said first type of information to be depicted as said image; and user input defining one or more areas of said image to have said common trait.

7. The method of claim 1, wherein said first type of information comprises high spatial resolution information and said second type of information comprises low spatial resolution information.

8. The method of claim 1, wherein said method comprises a method for producing a color wash image wherein both the first type of information and the second type of information are depicted within said color wash image and wherein depiction of said common trait using said second type of information is accomplished without blocking depiction of said image produced using said first type of information.

9. The method of claim 1, wherein said identifying (ii) comprises determining a subregion of said image to indicate said common trait, said subregion being represented by said subset of pixels of said image.

10. The method of claim 1, wherein said first data set and said second data set each comprise two dimensional data sets.

11. A system for producing an image represented by values of pixels, each value of each pixel of said image comprising a hue and a saturation pair color value and a luminance value $L_{pixel}$, said system comprising:

(i) means for determining, for each pixel of said image as a whole, said luminance value $L_{pixel}$ from a first data set representative of a first type of information to be depicted as said image;

(ii) means for identifying a subset of pixels to be altered, out of said image as a whole, based upon information from a second data set representative of a second type of information to be depicted in said image, wherein each pixel of said subset possesses a common trait not possessed by said pixels of said image that are not members of said subset, wherein said second data set containing said information used to identify said subset originates from a source distinct from said first data set;

(iii) means for assigning a single color to each said pixel of said subset to indicate possession of said common trait, and altering said hue and saturation pair color values of said subset such that each pixel of said subset has the same hue and saturation pair color values in accordance with said assignment; and (iv) means for scaling the luminance value $L_{pixel}$ of each pixel in said subset by a uniform factor thereby maintaining relative contrast among said luminance values $L_{pixel}$, as derived from said first data set, wherein said first type of information to be depicted as said image is visually represented by said luminance values $L_{pixel}$, within said image, and wherein said common trait possessed by said subset of pixels identified from information derived from said second data set is visually represented within said image as having the same hue and saturation pair color values.

12. The system of claim 11, wherein said system further comprises:

means for determining a maximum luminance value $max(L_{color})$ for said color value; and means for determining a maximum value of luminances $max(L_{pixel})$ of said subset having said common trait;

said uniform factor being $max(L_{color})/max(L_{pixel})$.

13. The system of claim 11, wherein said system further comprises:

means for determining a maximum luminance value $max(L_{color})$ for said color value; and means for determining a maximum value of luminances $max(L_{pixel})$ of pixels of said image;

said uniform factor being $\max(L_{color})/\max(L_{pixel})$.

14. The system of claim 13, further including means for scaling the luminance value $L_{pixel}$ of each of said pixels of said image by a factor of $\max(L_{color})/\max(L_{pixel})$ if max $(L_{pixel})$ is greater than $\max(L_{color})$.

15. The system of claim 11, wherein said uniform factor is one.

16. The system of claim 11, wherein said second data set used in said means for identifying a subset of pixels to be altered comprises at least one of:

one or more data files separate from said first data set containing said first type of information to be depicted as said image; and user input defining one or more areas of said image to have said common trait.

17. The system of claim 11, wherein said first type of information comprises high spatial resolution information and said second type of information comprises low spatial resolution information.

18. The system of claim 11, wherein said system further comprises a system for producing a color wash image wherein both the first type of information and the second type of information are depicted within said color wash image, and wherein depiction of said common trait using said second type of information is accomplished without blocking depiction of said image produced using said first type of information.

19. The system of claim 11, wherein said means for determining (ii) comprises means for identifying a subregion of said image to indicate said common trait, said subregion being represented by said subset of pixels of said image.

20. The system of claim 11, wherein said first data set and said second data set each comprise two dimensional data sets.

21. A computer program product comprising a computer useable medium having computer readable program code means therein for producing an image represented by values of pixels, each value of each pixel of said image comprising a hue and a saturation pair color value luminance value $L_{pixel}$, the computer readable program code means in the computer program product comprising:

computer readable program code means for determining, for each pixel of said image as a whole, said luminance value $L_{pixel}$ from a first data set representative of a first type of information to be depicted as said image;

computer readable program code means for identifying a subset of pixels to be altered, out of said image as a whole, based upon information from a second data set representative of a second type of information to be depicted in said image, wherein each pixel of said subset possesses a common trait not possessed by said pixels of said image that are not members of said subset, wherein said second data set containing said information used to identify said subset originates from a source distinct from said first data set;

computer readable program code means for assigning a single color to each said pixel of said subset to indicate possession of said common trait, and alerting said hue and saturation pair color values of said subset such that each pixel of said subset has the same hue and saturation pair color values in accordance with said assignment; and computer readable program code means for scaling the luminance value $L_{pixel}$ of each pixel in said subset by a uniform factor thereby maintaining relative contrast among said luminance values $L_{pixel}$ as derived from said first data set, wherein said first type of information to be depicted as said image is visually represented by said luminance values $L_{pixel}$ within said image, and wherein said common trait possessed by said subset of pixels identified from information derived from said second data set is visually represented within said image as having the same hue and saturation pair color values.

22. The computer program product of claim 21, wherein said computer program product further comprises:

computer readable program code means for determining a maximum luminance value $\max(L_{color})$ for said color value; and computer readable program code means for determining a maximum value of luminances $\max(L_{pixel})$ of said subset having said common trait;

said uniform factor being $\max(L_{color})/\max(L_{pixel})$.

23. The computer program product of claim 21, wherein said computer program product further comprises:

computer readable program code means for determining a maximum luminance value $\max(L_{color})$ for said color value; and computer readable program code means for determining a maximum value of luminances $\max(L_{pixel})$ of pixels of said image;

said uniform factor being $\max(L_{color})/\max(L_{pixel})$.

24. The computer program product of claim 23, further including computer readable program code means for scaling the luminance value $L_{pixel}$ of each of said pixels of said image by a factor of $\max(L_{color})/\max(L_{pixel})$ if $\max(L_{pixel})$ is greater than $\max(L_{color})$.

25. The computer program product of claim 21, wherein said uniform factor is one.

26. The computer program product of claim 21, wherein said second data set used in said computer readable program code means for identifying a subset of pixels to be altered comprises at least one of:

one or more data files separate from said first data set containing said first type of information to be depicted as said image; and user input defining one or more areas of said image to have said common trait.

27. The computer program product of claim 21, wherein said first type of information comprises high spatial resolution information and said second type of information comprises low spatial resolution information.

28. The computer program product of claim 21, wherein said computer program product comprises a computer usable medium having computer readable program code means therein for producing a color wash image wherein both the first type of information and the second type of information are depicted within said color wash image, and wherein depiction of said common trait using said second type of information is accomplished without blocking depiction of said image produced using said first type of information.

29. The computer program product of claim 21, wherein said computer readable program code means for identifying a subset of pixels to be altered comprises computer readable program code means for identifying a subset of said image to indicate a subregion of said image as said common trait, said subregion being represented by said one or more pixels of said image.

30. The computer program product of claim 21, wherein said first data set and said second data set each comprise two-dimensional data sets.

31. A method for producing an image represented by values of pixels, each value of each pixel of said image comprising a hue and a saturation pair color value and a luminance value $L_{pixel}$, said method comprising:

determining, for each pixel of said image as a whole, said luminance value $L_{pixel}$ from a first data set representative of a first type of information to be depicted as said image;

identifying at least one subset of pixels to be altered, out of said image as a whole, based upon information from a second data set representative of a second type of information to be depicted in said image, wherein each pixel of a particular subset possesses a common trait not possessed by said pixels that are not members of said particular subset, wherein said second data set containing said information used to identify said subset originates from a source distinct from said first data set;

determining N color values, one color value of which each subset is to be given;

determining a maximum luminance value $\max(L_{colorN})$ for each of said N color values;

determining a minimum of said maximum luminance values $\min(\max(L_{colorN}))$;

determining a maximum of luminance values $\max(L_{pixel})$ of pixels of said image;

if $\max(L_{pixel})$ is greater than $\min(\max(L_{colorN}))$, scaling the luminance value $L_{pixel}$ of each of said pixels of said image by a factor of $\min(\max(L_{colorN}))/\max(L_{pixel})$; and assigning a single color, corresponding to one of said N color values, to each subset to indicate possession of said common trait and altering said hue and saturation pair color values of each subset, in accordance with said assignment, such that pixels belonging to a subset have the same hue and saturation pair color values, and scaling the luminance value $L_{pixel}$ of each pixel in each subset by a uniform factor corresponding to said one of N color values thereby maintaining relative contrast among said luminance values $L_{pixel}$, as derived from said first data set, wherein said first type of information to be depicted as said image is visually represented by said luminance values $L_{pixel}$, within said image, and wherein said common trait possessed by each subset of pixels identified from information derived from said second data set is visually represented within said image as having the same hue and saturation pair color values.

32. The method of claim 31, wherein if $\max(L_{pixel})$ is not greater than $\min(\max(L_{colorN}))$, said uniform factor is $\max(L_{colorN})/\max(L_{pixel})$.

33. The method of claim 31, wherein if $\max(L_{pixel})$ is not greater than $\min(\max(L_{colorN}))$, said uniform factor is $\min(\max(L_{colorN}))/\max(L_{pixel})$.

34. The method of claim 31, wherein said uniform factor is one.

* * * * *